UNITED STATES PATENT OFFICE.

JOHN H. STEVENS, OF NEWARK, NEW JERSEY, ASSIGNOR TO THE CELLULOID COMPANY, OF SAME PLACE, A CORPORATION OF NEW JERSEY.

PYROXYLIN COMPOUND.

SPECIFICATION forming part of Letters Patent No. 552,935, dated January 14, 1896.

Original application filed November 13, 1895, Serial No. 568,664. Divided and this application filed November 13, 1895, Serial No. 568,816. (No specimens.)

*To all whom it may concern:*

Be it known that I, JOHN H. STEVENS, a citizen of the United States, residing at Newark, in the county of Essex and State of New Jersey, have invented certain new and useful Improvements in the Manufacture of Massive Compounds of Pyroxylin, of which the following is a specification.

The state of the art, and the nature and uses of the particular pyroxyline compounds to which my invention appertains, are described or referred to in my United States Letters Patent No. 542,692, granted July 16, 1895, and No. 543,197, granted July 23, 1895.

This invention is confined to the production of pyroxyline combinations in masses of a stiff or dough-like consistency, which are manipulated by means of heat and pressure (either in rolls, stuffing machinery, or any other suitable well-known apparatus) and are finally made into imitations of natural substances.

It has for its object an improvement of the usual camphor solvent, which improvement is accomplished by employing with the camphor the well-known substance crystalline camphene hydrochlorate or "artificial camphor." There are a number of varieties of this substance isomeric with each other, the principal one being that produced by passing dry hydrochloric-acid gas through oil of turpentine. Owing to the varieties of this substance embraced under the generic name of "artificial camphor," it is difficult to give a general formula; but they approximate to the formula $C_{10}H_{16}.HCl$. During a long course of experimenting in this field, I have ascertained that the camphene hydrochlorate when used alone is not practically useful as a substitute for gum-camphor. This, I find, is due to the non-solvent character of the camphene hydrochlorate, either alone, when melted by heat, or in solution. I have finally succeeded, however, in applying camphene hydrochlorate as a solid solvent by employing it in suitable proportions with the gum-camphor, and under certain conditions, such as the selection of the appropriate liquid solvents, all as hereinafter described.

I find that a combination of equal parts, by weight, of the camphene hydrochlorate and camphor can be used in all respects the same as the camphor alone, as the camphene hydrochlorate loses its non-solvent character in the presence of the camphor, so that the mixture is a solvent of the pyroxyline. This curious property accords with my experience with other solvents, recorded in my patents already referred to.

For practical results in all the usual processes, it is necessary to limit the employment of liquid solvents to be used in connection with the solid solvent and pyroxyline to one or more members of a group consisting of acetone, and the acetates of amyl, butyl, propyl, ethyl or methyl, or their combinations with a high grade of wood-alcohol.

I find that ethyl alcohol, pure methyl alcohol and amyl alcohol are practically useless as liquid menstrua for my camphene-hydrochlorate-camphor combinations when used alone, although either of these three alcohols will operate beneficially when combined with acetone or amyl acetate. The employment of these three alcohols to the exclusion of one or more of the members of the recommended group results in products lacking homogeneity and tenacity and otherwise inferior, although for certain limited purposes the drying out of the objectionable liquid solvent and subsequent subjection to heat and pressure restores the compound to a fairly-good solid product through the operation of the solvent powers of the mixture of camphene hydrochlorate and camphor when they are heated in the presence of pyroxyline. The wood-spirit of commerce, freed as far as possible from water, is more or less useful according to the amount of acetone it contains; but for the best effects should be combined with the proper solvent, as recommended.

The following is an example of a successful mixture which I have employed to make a tenacious, homogeneous compound, which can be seasoned and afterward molded or cut into different shapes, as desired. It is understood that the color or appearance of the combination can be varied by the use of suitable colors, or other well-known means, as desired: Pyroxyline, one hundred parts; camphor, twenty parts; camphene hydrochlorate, twenty parts; acetone, fifteen parts; acetate of amyl, fifteen parts; wood-spirit, twenty parts; color, as desired. The proportions are by weight.

Without the coloring matter, the above mixture makes a transparent compound. If a slow-drying mixture is desired, then the acetate of amyl can preponderate or be used as the only liquid solvent. If, on the other hand, a quick-drying mixture is desired, then the acetone must be used in the same way. The other solvents of the group can be used according to their known volatilities. These preferred liquid solvents form a group of equivalents for the purposes of the present invention, on account of their peculiar action with the new solid solvent combination. The group the use of which I claim in connection with the camphene-hydrochlorate-camphor solvent, embraces the following liquids: acetone, acetate of amyl, acetate of butyl, acetate of propyl, acetate of ethyl and acetate of methyl.

I have given good proportions, but do not limit myself to any particular proportions or methods of mixing.

I believe that I am the first to demonstrate the usefulness and solvent powers on pyroxyline of the camphene hydrochlorate in combination with camphor, and with any one or more of the members of the hereinbefore specified preferred group of liquid solvents in these compounds. Any heating under pressure of the pyroxyline, when in close combination with the mixture of camphene hydrochlorate-camphor and the other herein specified solvents, performed in such a way as to soften or shape the mass, is an employment of my process of manufacture.

The employment of my camphene-hydrochlorate-camphor solvent alone or in connection with liquid solvents, forms the subject of a separate application filed herewith, Serial No. 568,664, of which this application is a division.

Having thus described my invention, what I claim, and desire to secure by Letters Patent, is—

1. The process of manufacturing massive compounds of pyroxyline which consists in mixing pyroxyline, camphene hydrochlorate, camphor and one or more members of the hereinbefore specified preferred group of liquid solvents, and then subjecting the resulting compound to heat and pressure, substantially as set forth.

2. The process of manufacturing massive compounds of pyroxyline which consists in mixing pyroxyline, camphene hydrochlorate, camphor, one or more members of the hereinbefore specified preferred group of liquid solvents, and one or more other liquid menstruum or menstrua, and then subjecting the resulting compound to heat and pressure, substantially as set forth.

3. As a new composition of matter a massive pyroxyline compound containing pyroxyline, camphene hydrochlorate, camphor and one or more members of the hereinbefore specified preferred group of liquid solvents, substantially as described.

4. As a new composition of matter, a massive pyroxyline compound containing pyroxyline, camphene hydrochlorate, camphor, one or more members of the hereinbefore specified preferred group of liquid solvents, and also containing one or more other liquid menstruum or menstrua, substantially as described.

In witness whereof I have hereunto signed my name this 11th day of November, 1895.

JOHN H. STEVENS.

In presence of—
W. H. BERRIGAN, Jr.,
W. S. JONES.